US012750578B2

(12) United States Patent
Hamada et al.

(10) Patent No.: US 12,750,578 B2
(45) Date of Patent: Sep. 29, 2026

(54) DISTAL-END STRUCTURE OF ENDOSCOPE, ENDOSCOPE, AND CONNECTION MEMBER

(71) Applicant: Murata Manufacturing Co., Ltd., Nagaokakyo (JP)

(72) Inventors: Shu Hamada, Nagaokakyo (JP); Tetsuo Kawakami, Nagaokakyo (JP); Hiroyuki Dai, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 18/983,729

(22) Filed: Dec. 17, 2024

(65) Prior Publication Data

US 2025/0119633 A1 Apr. 10, 2025

Related U.S. Application Data

(63) Continuation of application No. PCT/JP2023/023561, filed on Jun. 26, 2023.

(30) Foreign Application Priority Data

Jun. 30, 2022 (JP) ................................ 2022-105840

(51) Int. Cl.
*H04N 23/50* (2023.01)
*H04N 23/56* (2023.01)
*H04N 23/57* (2023.01)

(52) U.S. Cl.
CPC ........... *H04N 23/555* (2023.01); *H04N 23/56* (2023.01); *H04N 23/57* (2023.01)

(58) Field of Classification Search
CPC ...... H04N 23/555; H04N 23/56; H04N 23/57; A61B 1/04; A61B 1/05; A61B 1/06; G02B 23/24
See application file for complete search history.

(56) References Cited

U.S. PATENT DOCUMENTS 11,153,970 B1 10/2021 Smith
11,249,300 B1 * 2/2022 Lin ........................ H04N 23/56
(Continued)

FOREIGN PATENT DOCUMENTS

EP 3788941 A1 3/2021
EP 3788943 A1 3/2021
(Continued)

OTHER PUBLICATIONS

International Search Report received for PCT Patent Application No. PCT/JP2023/023561, mailed on Aug. 8, 2023, 2 pages (English translation only).

*Primary Examiner* — Nasim N Nirjhar
(74) *Attorney, Agent, or Firm* — ArentFox Schiff LLP

(57) ABSTRACT

A distal-end structure of an endoscope includes an image sensor disposed in a distal-end portion of an insertion portion of the endoscope elongated in an axial direction D1. The image sensor is directed in the axial direction D1 toward a distal end of the insertion portion and is configured to capture an image. A light-emitting device is disposed in the distal-end portion and configured to emit light in the axial direction D1 toward the distal end. A connection member is disposed inside the distal-end portion and in which the image sensor and the light-emitting device are mounted. Wires are connected to the connection member. The wires supply electricity for driving the image sensor and the light-emitting device from outside the endoscope, transmit driving signals, and also transmit captured image data to a control unit.

17 Claims, 3 Drawing Sheets

(56) References Cited

U.S. PATENT DOCUMENTS

| | | | | |
|---|---|---|---|---|
| 11,347,047 | B2 | 5/2022 | Endo | |
| 11,558,534 | B2 | 1/2023 | Numasawa et al. | |
| 11,957,306 | B2 | 4/2024 | Kodama et al. | |
| 2006/0058584 | A1 | 3/2006 | Hirata | |
| 2021/0037169 | A1 | 2/2021 | Numasawa et al. | |
| 2021/0247604 | A1 | 8/2021 | Endo | |
| 2021/0401267 | A1 | 12/2021 | Kodama et al. | |
| 2023/0124488 | A1 * | 4/2023 | Noyes ...................... | A61B 1/05<br>600/160 |
| 2023/0404382 | A1 * | 12/2023 | Sørensen ............. | A61B 1/0684 |

FOREIGN PATENT DOCUMENTS

| | | | |
|---|---|---|---|
| JP | 2005-270391 | A | 10/2005 |
| JP | 2019-136248 | A | 8/2019 |
| WO | 2020/070855 | A1 | 4/2020 |
| WO | 2020/188687 | A1 | 9/2020 |

* cited by examiner

DISTAL-END STRUCTURE OF ENDOSCOPE, ENDOSCOPE, AND CONNECTION MEMBER

CROSS-REFERENCE TO RELATED APPLICATIONS

The present application is a continuation of International application No. PCT/JP2023/023561, filed Jun. 26, 2023, which claims priority to Japanese Application No. 2022-105840, filed on Jun. 30, 2022, the entire contents of each of which are incorporated herein by reference.

TECHNICAL FIELD

The present disclosure relates to a distal-end structure of endoscope, an endoscope, and a connection member.

BACKGROUND

Endoscopes are widely used in the medical field and in the manufacturing industries. The endoscope enables a user to observe the inside of a subject while the insertion portion of the endoscope elongated in the axial direction is inserted in the subject.

The endoscope is equipped with electronic components, such as an image sensor (i.e., imaging device) and a light-emitting device at the distal end thereof.

One type of endoscope features a distal-end portion of an endoscope structured such that an image sensor, a light emission diode (LED) serving as a light-emitting device, an electronic component such as a capacitor, and wires are attached to a flexible printed circuit (FPC).

Another type of endoscope features a distal-end portion of an endoscope structured such that an image sensor, an electronic component such as a capacitor, and wires are attached to a circuit board such as a printed circuit board (PCB). In this case, an LED serving as a light-emitting device may be attached to the distal-end portion of the endoscope.

SUMMARY

The distal-end structure of the first type of endoscope previously mentioned uses the FPC, and it is necessary to bend the FPC and insert the FPC into the distal-end portion of the endoscope after an image sensor, a light-emitting device, and wires are mounted on the FPC. Reaction forces are thereby generated in the FPC, which makes it difficult to position the image sensor and the light-emitting device appropriately. Moreover, this may cause wire breakage when the FPC is bent or folded.

In the second type of endoscope, the image sensor is mounted at the end of the circuit board. It is not easy, however, to mount the image sensor onto the end portion of the circuit board. Moreover, when the light-emitting device is mounted on the distal-end portion of the endoscope, the light-emitting device is to be mounted on the principal surface of the circuit board. It is not easy, however, to mount the light-emitting device on the principal surface of the circuit board while the light-emitting device is directed so as to emit light in the image capturing direction of the image sensor.

Accordingly, an object of the present disclosure is to provide a distal-end structure of endoscope equipped with a connection member that enables the image sensor and the light-emitting device to be mounted so as to be directed as necessary and to be disposed appropriately in the distal-end portion without necessity of changing the direction after mounted. Other objects of the present disclosure are to provide an endoscope equipped with the above distal-end structure of endoscope and to provide the above connection member.

A distal-end structure of endoscope according to the present disclosure includes an image sensor disposed in a distal-end portion of an insertion portion of the endoscope elongated in an axial direction, the image sensor being directed in the axial direction toward a distal end of the insertion portion and being configured to capture an image; a light-emitting device that is disposed in the distal-end portion and are configured to emit light in the axial direction toward the distal end; and a connection member that is disposed inside the distal-end portion and in which the image sensor and the light-emitting device is mounted. Wires are connected to the connection member, and the wires serve to supply electricity to the image sensor and the light-emitting device from outside the endoscope, to transmit a driving signal, and to transmit captured image data to a control unit. The connection member includes a first wall surface extending so as to intersect the axial direction perpendicularly, a second wall surface and a third wall surface that extend parallel to the first wall surface and are positioned closer to the distal end in the axial direction than the first wall surface to the distal end, and open surfaces that oppose each other and are formed between the first wall surface and the second wall surface and between the first wall surface and the third wall surface. The connection member further includes a first pad disposed on the first wall surface, the first pad being used for mounting the image sensor; and a second pad disposed on each of the second wall surface and the third wall surface, the second pad being used for mounting the light-emitting device. The connection member further includes a circuit disposed inside thereof, and the circuit serves to electrically connect the image sensor, the light-emitting device, and the wires. Each of the image sensor, the light-emitting device, and the wires is electrically and mechanically connected to the connection member.

The endoscope according to the present disclosure includes the distal-end structure of endoscope of the present disclosure.

The connection member of the present disclosure is to be used for mounting an image sensor and a light-emitting device at the distal end of an endoscope. The connection member includes: a first wall surface; a second wall surface and a third wall surface that extend parallel to the first wall surface and are positioned outward from the first wall surface; and open surfaces that oppose each other and are formed between the first wall surface and the second wall surface and between the first wall surface and the third wall surface. The connection member further includes a first pad disposed on the first wall surface, the first pad being used for mounting the image sensor; and a second pad disposed on each of the second wall surface and the third wall surface, the second pad being used for mounting the light-emitting device. The connection member further includes portions to which wires are attached, and the wires serve to supply electricity to the image sensor and the light-emitting device from outside the endoscope, to transmit a driving signal, and to transmit captured image data to a control unit. The connection member further includes a circuit disposed inside thereof, and the circuit serves to electrically connect the image sensor, the light-emitting device, and the wires.

According to the present disclosure, a distal-end structure of endoscope equipped with a connection member may be provided. The connection member enables the image sensor and the light-emitting device to be mounted so as to be directed as necessary and to be disposed appropriately in the distal-end portion without necessity of changing the direction after mounted. According to the present disclosure, the endoscope equipped with the above distal-end structure of endoscope and the above connection member may be provided.

DETAILED DESCRIPTION

A distal-end structure of endoscope, an endoscope, and a connection member according to the present disclosure will be described.

Note that the embodiment described herein is not intended to limit the present disclosure, and the embodiment may be modified appropriately within the gist of the present disclosure. Note that two or more of the individual configurations described in the embodiment below may be combined, and such a combination is deemed to be included in the present disclosure.

In the present specification, terms used to describe a relationship between elements (for example, “perpendicular”, “parallel”, “orthogonal”, and so on) or to describe the shape of an element are not used in their strict senses but are used so as to allow for a certain range, for example, a several-percent difference.

The drawings to be referred to below are schematic illustrations, and accordingly dimensions, aspect ratios, or the like may be different from those of an actual product.

Figure 1:
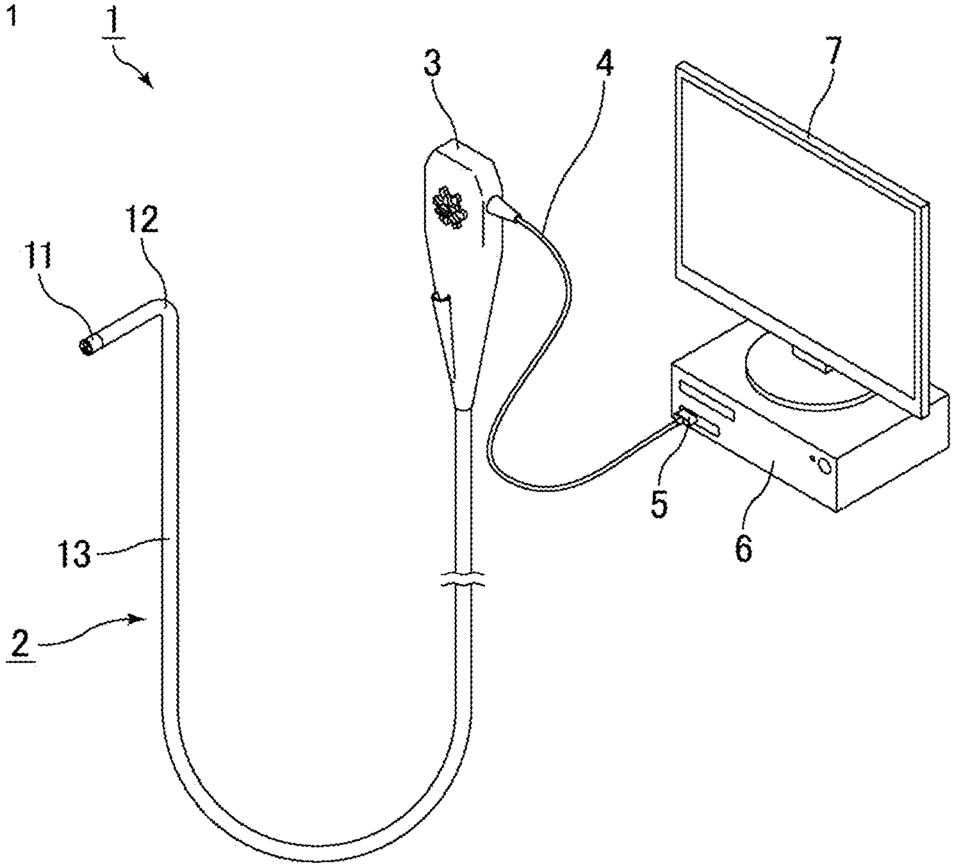
FIG. 1 is a perspective view schematically illustrating an endoscope according to an embodiment of the present disclosure together with an external device and a monitor.
Figure 2:
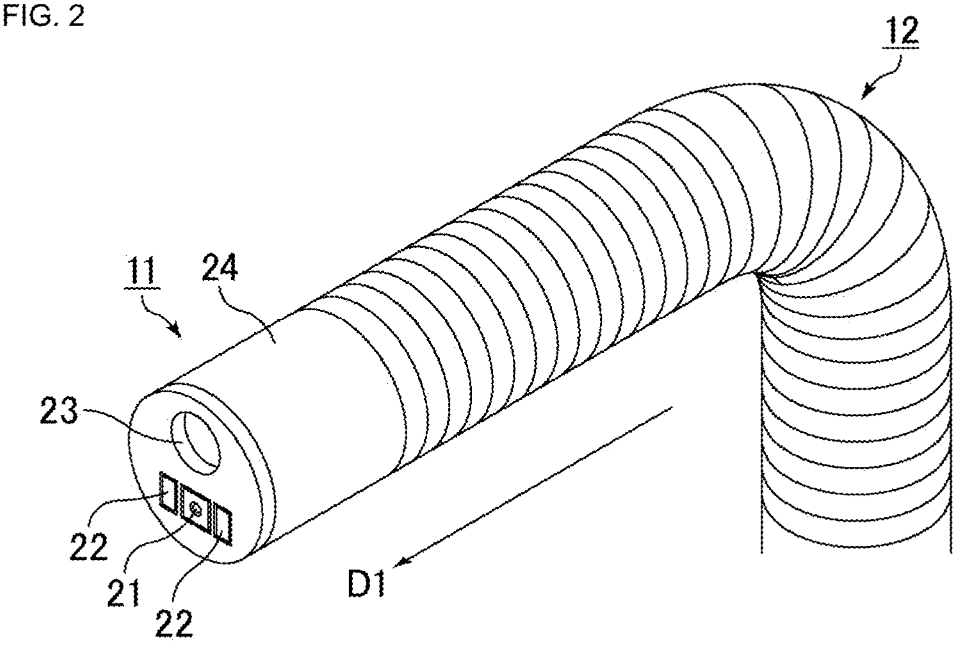
FIG. 2 is a perspective view schematically illustrating an example of a distal-end structure of the endoscope of FIG. 1.

FIG. 1 is a perspective view schematically illustrating an endoscope according to an embodiment of the present disclosure together with an external device and a monitor. FIG. 2 is a perspective view schematically illustrating an example of a distal-end structure of the endoscope of FIG. 1.

As illustrated in FIG. 1, for example, an endoscope 1 includes, as a main component, an insertion portion 2 to be inserted into a subject, an operation portion 3 disposed at a proximal end of the insertion portion 2, a cord 4 extended out from the operation portion 3, and a connector 5 disposed at the end of the cord 4.

The subject into which the endoscope 1 is inserted is not limited to a human body but may be another living body or may be an artifact, such as a machine or a building.

The insertion portion 2 has an elongated shape extending in the axial direction. The insertion portion 2 includes, for example, a distal-end portion 11 positioned near the distal end thereof, a bend portion 12 disposed at the proximal end of the distal-end portion 11, and a flexible tube 13 connected to the proximal end of the bend portion 12. Because of the insertion portion 2 being equipped with the bend portion 12, the insertion portion 2 may be bent inside the subject, which is preferable.

As illustrated in FIG. 2, the distal-end portion 11 is equipped with an image sensor 21 that is directed toward the distal end in an axial direction D1 and configured to capture images. The distal-end portion 11 is also equipped with a light-emitting device 22 configured to emit light in the axial direction D1 toward the distal end. In the present embodiment, a pair of light-emitting devices 22 are provided in the distal-end portion 11.

An example of the image sensor 21 is a solid imaging device, such as a charge coupled device (CCD) or a complementary metal oxide semiconductor (CMOS). A camera module equipped with the image sensor 21 may be disposed in the distal-end portion 11. The camera module includes, for example, a lens and optical system in addition to the image sensor 21.

An example of the light-emitting device 22 is a semiconductor device, such as a light-emitting diode (LED). An optical device such as a light guide and lens may be disposed in front (i.e., on the distal end side in the axial direction D1) of the light-emitting device 22 such as LED.

As illustrated in FIG. 2, the distal-end portion 11 may be equipped with a working channel 23 to be used for biopsy.

The distal-end portion 11 is preferably covered by a distal-end cover 24 made of an insulating material. For example, the distal-end cover 24 is a tubular member made of resin.

The bend portion 12 is an active element configured to be operated using the operation portion 3 and to be bent in two directions (in the up-down direction) or in four directions (in the up-down and right-left directions). The up-down direction and the right-left direction here are defined so as to correspond to the up-down direction and the right-left direction of the endoscope image captured by the image sensor 21.

The flexible tube 13 has flexibility so as to be bent passively. In addition to the working channel 23, various types of wires or the like, which are electrically connected to the image sensor 21 and the light-emitting devices 22 disposed in the distal-end portion 11, pass through inside the flexible tube 13.

The cord 4 is also a tubular member having flexibility. The cord 4 is extended out from the operation portion 3. The connector 5 is connected to an external device 6.

The external device 6 includes an image processing unit (i.e., a control unit), which is not illustrated. The image processing unit generates a video signal based on a signal output from the image sensor 21 of the endoscope 1 and outputs the video signal to a monitor 7.

Accordingly, in the present embodiment, an optical image (an endoscope image) captured by the image sensor 21 is displayed as a video image on the monitor 7.

The distal-end portion 11 of the endoscope 1 of the present embodiment will be described in detail.

Figure 3:
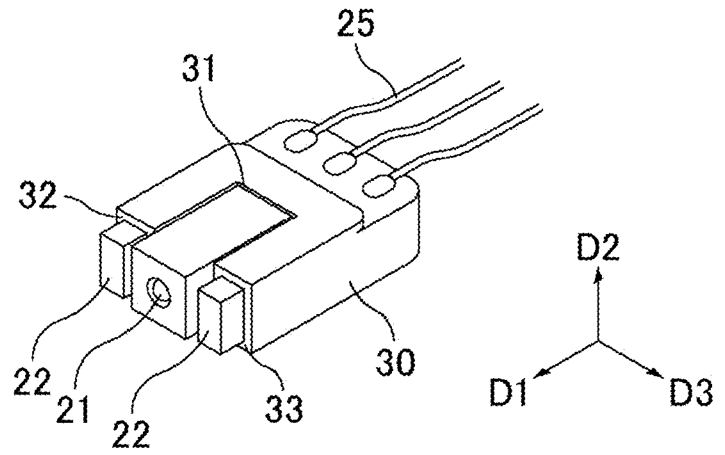
FIG. 3 is a perspective view schematically illustrating an example of an internal structure of a distal-end portion illustrated in FIG. 2.

FIG. 3 is a perspective view schematically illustrating an example of an internal structure of the distal-end portion illustrated in FIG. 2.

A connection member 30 equipped with the image sensor 21 and the light-emitting devices 22 as illustrated in FIG. 3 is disposed inside the distal-end portion 11 of FIG. 2.

Wires 25 are connected to the connection member 30. The wires 25 supply electricity for driving the image sensor 21 and the light-emitting devices 22 from outside the endoscope 1, transmit driving signals, and also transmit data of captured images to the control unit.

Figure 4:
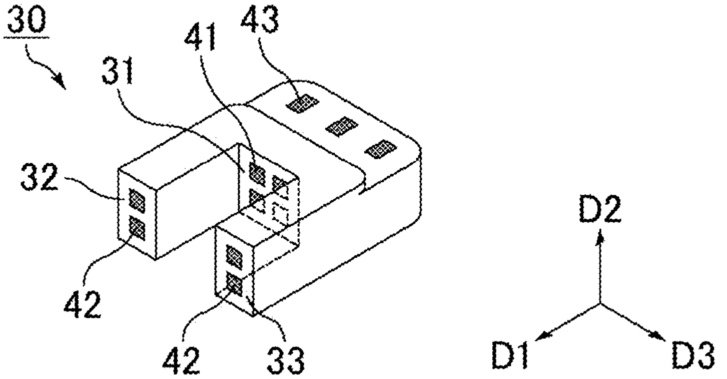
FIG. 4 is a perspective view schematically illustrating an example of a connection member illustrated in FIG. 3.
Figure 5:
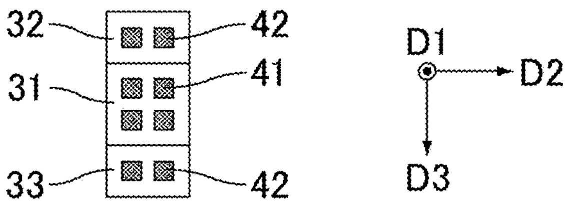
FIG. 5 is a plan view illustrating the connection member of FIG. 4 when a first wall surface is viewed in plan.
Figure 6:
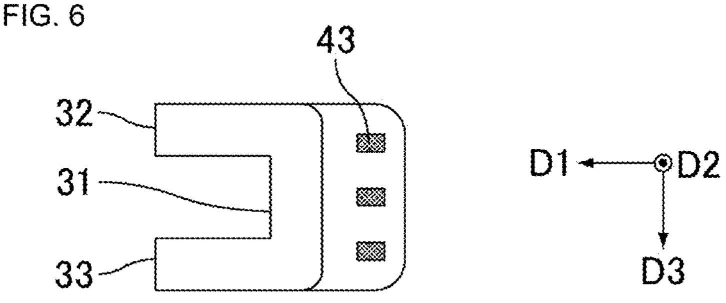
FIG. 6 is a plan view illustrating the connection member of FIG. 4 when an open surface is viewed in plan.

FIG. 4 is a perspective view schematically illustrating an example of the connection member of FIG. 3. FIG. 5 is a plan view illustrating the connection member of FIG. 4 when a first wall surface is viewed in plan. FIG. 6 is a plan view illustrating the connection member of FIG. 4 when an open surface is viewed in plan.

As illustrated in FIGS. 3 and 4, the connection member 30 has a first wall surface 31, a second wall surface 32, and a third wall surface 33. The second wall surface 32 and the third wall surface 33 extend parallel to the first wall surface 31 but are positioned outward from the first wall surface 31. In the distal-end portion 11, the first wall surface 31 perpendicularly intersects the axial direction D1, and the second wall surface 32 and the third wall surface 33 are positioned closer to the distal end than the first wall surface 31 to the distal end in the axial direction D1.

The connection member 30 has open surfaces that oppose each other and are formed between the first wall surface 31 and the second wall surface 32 and between the first wall surface 31 and the third wall surface 33. These open surfaces are preferably parallel to each other. In the example illustrated in FIG. 4, the connection member 30 has the open surfaces that oppose each other in the direction indicated by D2 (i.e., in the direction D2) and that extend in directions indicated by D1 and D3 (i.e., in the direction D1 and in the direction D3).

The connection member 30 preferably has wall surfaces that oppose each other in a direction different from the axial direction and also different from the direction in which the open surfaces oppose each other, and the wall surfaces are formed between the first wall surface 31 and the second wall surface 32 and between the first wall surface 31 and the third wall surface 33. These wall surfaces are preferably parallel to each other. In the example illustrated in FIG. 4, the connection member 30 has the wall surfaces that oppose each other in the direction D3 and extend in the directions D1 and D2. One of the wall surfaces connects the first wall surface 31 and the second wall surface 32, and the other connects the first wall surface 31 and the third wall surface 33.

In some aspects, wires 25 are connected to connection member 30 at a wall surface of connection member 30 that is perpendicularly intersecting a direction in which the open surfaces oppose each other.

As illustrated in FIG. 5, when the first wall surface 31 of the connection member 30 is viewed in plan, the first wall surface 31 is positioned between the second wall surface 32 and the third wall surface 33. When the first wall surface 31 of the connection member 30 is viewed in plan, the first wall surface 31 preferably does not overlap the second wall surface 32 and the third wall surface 33. The first wall surface 31, however, may be or may not be in contact with the second wall surface 32 when the first wall surface 31 of the connection member 30 is viewed in plan. Similarly, the first wall surface 31 may be or may not be in contact with the third wall surface 33 when the first wall surface 31 of the connection member 30 is viewed in plan.

As illustrated in FIG. 6, when an open surface of the connection member 30 is viewed in plan, the connection member 30 is shaped like the letter U.

The height of the first wall surface 31 (i.e., the dimension in the direction D2) is preferably equal to the height of the second wall surface 32 and also to the height of the third wall surface 33. The height of the first wall surface 31 is preferably equal to or more than the height of the image sensor 21. More preferably, the height of the first wall surface 31 is equal to the height of the image sensor 21. Here, the meaning of the phrase "equal to the height" is not limited to the strict equality but may allow for approximately 3% difference.

The width of the first wall surface 31 (i.e., the dimension in the direction D3) may be or may not be equal to the width of the second wall surface 32. Similarly, the width of the first wall surface 31 may be or may not be equal to the width of the third wall surface 33. The width of the second wall surface 32 is preferably equal to the width of the third wall surface 33. Here, the meaning of the phrase "equal to the width" is not limited to the strict equality but may allow for approximately 3% difference.

For example, as viewed in plan, the shape of the first wall surface 31 is a square or a rectangle.

For example, as viewed in plan, the shapes of the second wall surface 32 and the third wall surface are rectangles or squares. As viewed in plan, the shape of the second wall surface 32 is preferably the same as that of the third wall surface 33.

In the direction D1, the distance between the first wall surface 31 and the second wall surface 32 is preferably equal to the distance between the first wall surface 31 and the third wall surface 33. Here, the meaning of the phrase "equal to the distance" is not limited to the strict equality but may allow for approximately 3% difference.

As illustrated in FIG. 4, the connection member 30 includes first pads 41 on the first wall surface 31 for the mounting of the image sensor 21. The connection member 30 includes second pads 42 on the second wall surface 32 and the third wall surface 33 for the mounting of respective light-emitting devices 22.

As illustrated in FIG. 3, when the image sensor 21 is mounted on the first pads 41 and the light-emitting devices 22 are mounted on the second pads 42, the top surface of the image sensor 21 and the top surfaces of respective light-emitting devices 22 are positioned parallel to each other. In FIG. 3, the top surfaces are surfaces facing outward at the distal end in the axial direction D1.

The connection member 30 further includes a portion to which the wires 25 are connected. The positions at which the wires 25 are attached are not specifically limited. In the example illustrated in FIG. 4, the connection member 30 has a step surface positioned lower than the wall surface extending parallel to the directions D1 and D3, the step surface being positioned closer to the proximal end of this wall surface. The connection member 30 includes third pads 43 on the step surface for the mounting of the wires 25. Accordingly, wires 25 are connected to the connection member at the step surface.

The connection member 30 includes a circuit (not illustrated) for electrically connecting the image sensor 21, the light-emitting devices 22, and the wires 25. The image sensor 21, the light-emitting devices 22, and the wires 25 are thereby connected to the connection member 30 electrically and mechanically. The circuit may be formed inside of the connection member 30 or on a surface of the connection member 30 or both inside of and on the surface of the connection member 30.

Thus, the connection member 30, in which the image sensor 21, the light-emitting devices 22, and the wires 25 are connected electrically and mechanically as in the state illustrated in FIG. 3, is held in the distal-end portion 11 as illustrated in FIG. 2.

The connection member 30 enables the image sensor 21 and the light-emitting devices 22 to face in the desired direction simply by mounting the connection member 30 at a predetermined position, which eliminates the necessity of adjusting the facing direction later. This leads to easy assembly of the distal-end portion 11. This also reduces the likelihood of wire breakage due to folding or bending compared with the case for using FPC, which improves the product reliability.

Conductor wiring for electrically connecting the image sensor 21, the light-emitting devices 22, and the wires 25 are preferably formed inside the connection member 30 as the above-described circuit. The formation of the circuit inside the connection member 30 leads to size reduction compared with the case of forming the circuit on the surface of the connection member 30.

The connection member 30 is preferably made of a rigid material. For example, the connection member 30 may be made of a ceramic material or a resin material. It is preferably that the connection member 30 be made of a ceramic material from the viewpoint of improving the heat resistance of the connection member 30 against the reflow heat when components such as light-emitting devices 22 are mounted.

Figure 7:
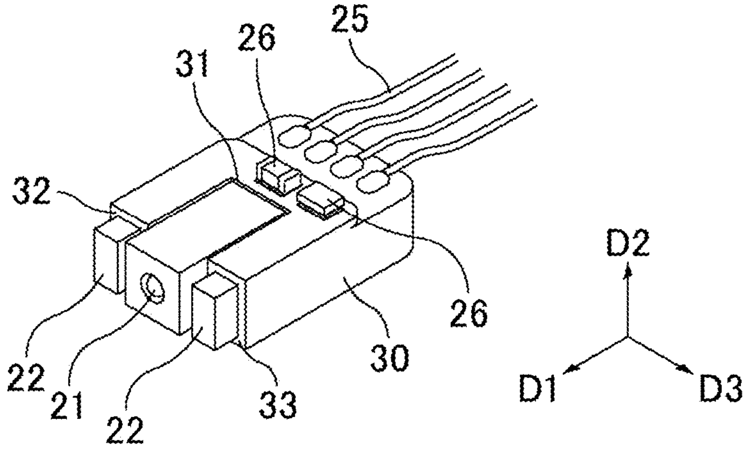
FIG. 7 is a perspective view illustrating another example of the internal structure of the distal-end portion of FIG. 2.
Figure 8:
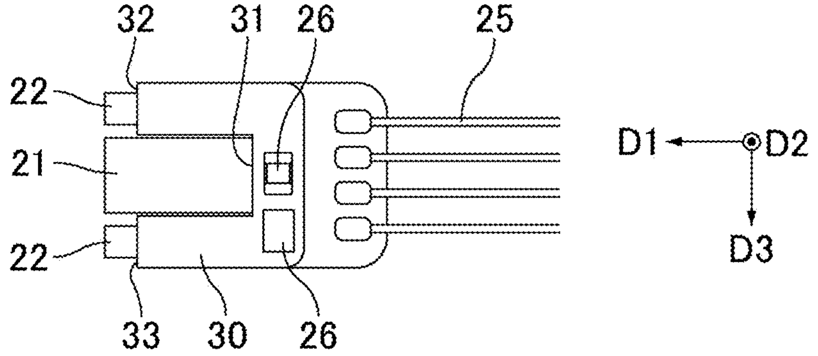
FIG. 8 is a plan view illustrating the internal structure of the distal-end portion of FIG. 7.

FIG. 7 is a perspective view schematically illustrating another example of the internal structure of the distal-end portion of FIG. 2. FIG. 8 is a plan view illustrating the internal structure of the distal-end portion of FIG. 7.

As illustrated in FIG. 7, the connection member 30 further includes a portion for mounting an electronic component 26 that is different from the image sensor 21 and the light-emitting devices 22. As the electronic component 26, a single type of electric component may be provided or two or more types of electronic components may be provided. The electronic component 26 is electrically connected to the image sensor 21, the light-emitting devices 22, and the wires 25.

An example of the electronic component 26 is a capacitor (a bypass capacitor for the image sensor) or a filter. This can improve the quality of the endoscope image.

The position at which the electronic component 26 is mounted is not specifically limited. In the example illustrated in FIGS. 7 and 8, the electronic component 26 is mounted on the wall surface that extends in the directions of D1 and D3, the wall surface being positioned higher than the step surface to which the wires 25 are attached and being positioned closer to the distal end than the step surface. The electronic component 26 may be mounted on this wall surface at a position closer to the proximal end than the first wall surface 31 or at a position closer to the distal end than the first wall surface 31. The electronic components 26 may be mounted on this surface both at the position closer to the proximal end and at the position closer to the distal end. The electronic component 26 may be mounted on one of the wall surfaces that oppose each other in the direction D2. Alternatively, the electronic components 26 may be mounted on both wall surfaces.

The following summarizes the points disclosed in the present specification.

Clause 1. A distal-end structure of endoscope includes: an image sensor disposed in a distal-end portion of an insertion portion of the endoscope elongated in an axial direction, the image sensor being directed in the axial direction toward a distal end of the insertion portion and being configured to capture an image; a light-emitting device that is disposed in the distal-end portion and configured to emit light in the axial direction toward the distal end; and a connection member that is disposed inside the distal-end portion and in which the image sensor and the light-emitting device is mounted. In the distal-end structure, wires are connected to the connection member, the wires serving to supply electricity to the image sensor and the light-emitting device from outside the endoscope, to transmit a driving signal, and to transmit captured image data to a control unit. In the distal-end structure, the connection member includes a first wall surface extending so as to intersect the axial direction perpendicularly, a second wall surface and a third wall surface that extend parallel to the first wall surface and are positioned closer to the distal end in the axial direction than the first wall surface to the distal end, and open surfaces that oppose each other and are formed between the first wall surface and the second wall surface and between the first wall surface and the third wall surface. The connection member further includes a first pad disposed on the first wall surface, the first pad being used for mounting the image sensor; and a second pad disposed on each of the second wall surface and the third wall surface, the second pad being used for mounting the light-emitting device. The connection member further includes a circuit disposed inside thereof, the circuit serving to electrically connect the image sensor, the light-emitting device, and the wires. Each of the image sensor, the light-emitting device, and the wires is electrically and mechanically connected to the connection member.

Clause 2. In the distal-end structure of endoscope according to clause 1, the circuit is conductor wiring formed inside the connection member, the conductor wiring serving to electrically connect the image sensor, the light-emitting device, and the wires.

Clause 3. In the distal-end structure of endoscope according to clause 1 or clause 2 above, the connection member is made of a ceramic material.

Clause 4. In the distal-end structure of endoscope according to any one of clause 1 to clause 3 above, the connection member further includes an electronic component that is different from the image sensor and the light-emitting device.

Clause 5. An endoscope includes the distal-end structure of endoscope according to any one of clause 1 to clause 4 above.

Clause 6. A connection member to be used for mounting an image sensor and a light-emitting device at a distal end of an endoscope, the connection member includes: a first wall surface; a second wall surface and a third wall surface that extend parallel to the first wall surface and are positioned outward from the first wall surface; open surfaces that oppose each other and are formed between the first wall surface and the second wall surface and between the first wall surface and the third wall surface; a first pad disposed on the first wall surface, the first pad being used for mounting the image sensor; a second pad disposed on each of the second wall surface and the third wall surface, the second pad being used for mounting the light-emitting device; portions to which wires are attached, the wires serving to supply electricity to the image sensor and the light-emitting device from outside the endoscope, to transmit a driving signal, and to transmit captured image data to a control unit; and a circuit disposed inside the connection member, the circuit serving to electrically connect the image sensor, the light-emitting device, and the wires.

Clause 7. In the connection member according to clause 6 above, the circuit is conductor wiring formed inside the connection member, the conductor wiring serving to electrically connect the image sensor, the light-emitting device, and the wires.

Clause 8. In the connection member according to clause 6 or clause 7 above, the connection member is made of a ceramic material.

Clause 9. The connection member according to any one of clause 6 to clause 8 above further includes a portion on which an electronic component other than the image sensor and the light-emitting device is mounted.

The invention claimed is:

1. A distal-end structure of an endoscope, comprising:
- an image sensor in a distal-end portion of an insertion portion of the endoscope elongated in an axial direction, the image sensor being directed in the axial direction toward a distal end of the insertion portion and configured to capture an image;
- a light-emitting device in the distal-end portion and configured to emit light in the axial direction toward the distal end; and
- a connection member inside the distal-end portion and in which the image sensor and the light-emitting device is mounted; and
- wires connected to the connection member, the wires configured to supply electricity to the image sensor and the light-emitting device from outside the endoscope, to transmit a driving signal, and to transmit captured image data to a control unit,
- wherein the connection member includes:
  - a first wall surface extending so as to intersect the axial direction perpendicularly,
  - a second wall surface and a third wall surface that extend parallel to the first wall surface and are positioned closer to the distal end in the axial direction than the first wall surface to the distal end,
  - open surfaces that oppose each other between the first wall surface and the second wall surface and between the first wall surface and the third wall surface,
  - a first pad on the first wall surface, the first pad configured to mount the image sensor,
  - a second pad on each of the second wall surface and the third wall surface, the second pad configured to mount the light-emitting device, and
  - a circuit inside the connection member, the circuit electrically connecting the image sensor, the light-emitting device, and the wires, and wherein each of the image sensor, the light-emitting device, and the wires are electrically and mechanically connected to the connection member.

2. The distal-end structure according to claim 1, wherein the circuit comprises conductor wiring formed inside the connection member, the conductor wiring configured to electrically connect the image sensor, the light-emitting device, and the wires.

3. The distal-end structure according to claim 2, wherein the wires are connected to the connection member at a wall surface of the connection member, the wall surface being different from wall surfaces perpendicularly intersecting the axial direction.

4. The distal-end structure according to claim 1,
- wherein the connection member has a step surface positioned lower than a wall surface that is different from wall surfaces perpendicularly intersecting the axial direction, the step surface being positioned near a proximal end of the wall surface, and
- wherein the wires are connected to the connection member at the step surface.

5. The distal-end structure according to claim 1, wherein the wires are connected to the connection member at a wall surface of the connection member, the wall surface perpendicularly intersecting a direction in which the open surfaces oppose each other.

6. The distal-end structure according to claim 1,
- wherein the connection member has a step surface positioned lower than a wall surface that perpendicularly intersects a direction in which the open surfaces oppose each other, the step surface being positioned near a proximal end of the wall surface, and
- wherein the wires are connected to the connection member at the step surface.

7. The distal-end structure according to claim 1, wherein the connection member is made of a ceramic material.

8. The distal-end structure according to claim 3, wherein the connection member further includes an electronic component that is different from the image sensor and the light-emitting device.

9. An endoscope comprising the distal-end structure according to claim 1.

10. A connection member for mounting an image sensor and a light-emitting device at a distal end of an endoscope, the connection member comprising:
- a first wall surface;
- a second wall surface and a third wall surface that extend parallel to the first wall surface and are positioned outward from the first wall surface;
- open surfaces that oppose each other between the first wall surface and the second wall surface and between the first wall surface and the third wall surface;
- a first pad on the first wall surface, the first pad configured to mount the image sensor;
- a second pad on each of the second wall surface and the third wall surface, the second pad configured to mount the light-emitting device;
- portions to which wires are attached, the wires configured to supply electricity to the image sensor and the light-emitting device from outside the endoscope, to transmit a driving signal, and to transmit captured image data to a control unit; and
- a circuit inside the connection member, the circuit electrically connecting the image sensor, the light-emitting device, and the wires.

11. The connection member according to claim 10, wherein the circuit comprises conductor wiring inside the connection member, the conductor wiring configured to electrically connect the image sensor, the light-emitting device, and the wires.

12. The connection member according to claim 11,
- wherein the portions to which the wires are attached are positioned at a wall surface of the connection member, the wall surface being different from wall surfaces perpendicularly intersecting an axial direction.

13. The connection member according to claim 10,
- wherein the connection member has a step surface positioned lower than a wall surface that is different from wall surfaces perpendicularly intersecting an axial direction, the step surface being positioned near a proximal end of the wall surface, and wherein the portions to which the wires are attached are on the step surface.

14. The connection member according to claim 10, wherein the portions to which the wires are attached are on a wall surface of the connection member, the wall surface being different from wall surfaces perpendicularly intersecting a direction in which the open surfaces oppose each other.

15. The connection member according to claim 10, wherein the connection member has a step surface positioned lower than a wall surface that perpendicularly intersects a direction in which the open surfaces oppose each other, the step surface being positioned near a proximal end of the wall surface, and wherein the portions to which the wires are attached are on the step surface.

16. The connection member according to claim 10, wherein the connection member is made of a ceramic material.

17. The connection member according to claim 10, further comprising:

a portion on which an electronic component other than the image sensor and the light-emitting device is mounted.

* * * * *